US008810085B2

(12) United States Patent
Matsunaga et al.

(10) Patent No.: US 8,810,085 B2
(45) Date of Patent: Aug. 19, 2014

(54) ELECTRIC POWER TOOL INCLUDING A PLURALITY OF CIRCUIT BOARDS

(75) Inventors: Yutaka Matsunaga, Anjo (JP); Takeshi Nishimiya, Anjo (JP)

(73) Assignee: Makita Corporation, Anjo-Shi (JP)

( * ) Notice: Subject to any disclaimer, the term of this patent is extended or adjusted under 35 U.S.C. 154(b) by 226 days.

(21) Appl. No.: 13/121,114

(22) PCT Filed: Jul. 2, 2009

(86) PCT No.: PCT/JP2009/062090
§ 371 (c)(1),
(2), (4) Date: Apr. 13, 2011

(87) PCT Pub. No.: WO2010/035563
PCT Pub. Date: Apr. 1, 2010

(65) Prior Publication Data
US 2011/0187211 A1   Aug. 4, 2011

(30) Foreign Application Priority Data

Sep. 26, 2008 (JP) .................................. 2008-247535

(51) Int. Cl.
*H02K 7/14* (2006.01)
(52) U.S. Cl.
USPC ................................ 310/50; 310/52; 173/217
(58) Field of Classification Search
USPC ....................... 310/50, 52; 173/217, 117, 118
See application file for complete search history.

(56) References Cited

U.S. PATENT DOCUMENTS

| 5,084,598 A * | 1/1992 | Nagata et al. ............... 200/16 C |
| 6,607,041 B2 * | 8/2003 | Suzuki et al. ................ 173/171 |
| 7,323,796 B2 * | 1/2008 | Oomori et al. .................. 310/50 |
| 2005/0121209 A1 * | 6/2005 | Shimizu et al. ............... 173/217 |
| 2006/0158049 A1 * | 7/2006 | Suzuki et al. .................... 310/52 |
| 2006/0255756 A1 * | 11/2006 | Iwata et al. .................... 318/254 |
| 2007/0246289 A1 * | 10/2007 | Tominaga ...................... 310/71 |
| 2008/0265695 A1 * | 10/2008 | Yoshida et al. ................. 310/50 |
| 2012/0319509 A1 * | 12/2012 | Kishima et al. ................ 310/50 |
| 2013/0313925 A1 * | 11/2013 | Mergener et al. .............. 310/50 |

FOREIGN PATENT DOCUMENTS

| EP | 1 715 565 A1 | 10/2006 |
| EP | 1 923 178 A1 | 5/2008 |
| JP | A-1-117213 | 5/1989 |
| JP | A-2001-239474 | 9/2001 |

(Continued)

OTHER PUBLICATIONS

Machine translation of JP2007-283447 (published: Nov. 2007, translated: Mar. 2013).*

(Continued)

*Primary Examiner* — Michael Andrews
(74) *Attorney, Agent, or Firm* — Oliff PLC

(57) ABSTRACT

An electric power tool, which uses a DC brushless motor as a drive source and controls the DC brushless motor by a switching element, can include a tubular housing main body portion accommodating the DC brushless motor, and a grip portion protruding from a side portion of the housing main body portion. The switching element is arranged inside the grip portion, and is spaced apart from an electronic circuit board for an electronic component for operating the switching element.

21 Claims, 3 Drawing Sheets

(56) References Cited

FOREIGN PATENT DOCUMENTS

| JP | A-2005-144564 | 6/2005 |
| JP | A-2006-937 | 1/2006 |
| JP | A-2006-142436 | 6/2006 |
| JP | A-2006-297532 | 11/2006 |
| JP | 2007283447 A * | 11/2007 |
| JP | A-2007-283447 | 11/2007 |
| WO | WO 2008/088017 A1 | 7/2008 |

OTHER PUBLICATIONS

International Search Report dated Sep. 15, 2009 in corresponding International Application No. PCT/2009/062090 (with translation).
Apr. 2, 2013 Office Action issued in Japanese Patent Application No. 2008-247535 (with translation).
Feb. 17, 2014 European Search Report issued in EP 09 81 5980.

* cited by examiner

ELECTRIC POWER TOOL INCLUDING A PLURALITY OF CIRCUIT BOARDS

BACKGROUND OF INVENTION

1. Field of the Invention

The present invention relates to an electric power tool that uses a DC brushless motor as the drive source and controls the DC brushless motor by a switching element.

2. Description of the Related Art

In an electric power tool that controls a DC brushless motor by utilizing a switching element, it is common practice to arrange the switching element behind the DC brushless motor. However, arrangement of the switching element behind the DC brushless motor involves an increase in the entire length of the electric power tool, resulting in deterioration in the usability of the electric power tool.

To solve this problem, Japanese Laid-Open Patent Publication No. 2007-283447 discloses an electric power tool in which a switching element is mounted to an electric circuit board together with an electronic component and is arranged at a protruding end of a grip portion. As a result, there is no need for providing a space for the switching element behind the DC brushless motor, making it possible to make the entire length of the electric power tool relatively small.

However, in the electric power tool disclosed in Japanese Laid-Open Patent Publication No. 2007-283447, the switching element and the electronic component such as a microprocessor for operating the switching element are mounted to the same electric circuit board, so that measures must be taken for protection against heat so that the electronic component may not be affected by the heat of the switching element.

Therefore, there is a need for the switching element to be spaced apart from the electronic component such as a microprocessor without involving an increase in the entire length of the electric power tool, thereby relieving the need for taking measures to protect the electronic component from heating.

SUMMARY OF THE INVENTION

According to a first aspect of the present invention, there is provided an electric power tool that uses a DC brushless motor as a drive source and controls the DC brushless motor by a switching element, comprising a tubular housing main body portion accommodating the DC brushless motor, and a grip portion protruding from a side portion of the housing main body portion, wherein the switching element is arranged inside the grip portion, and is spaced apart from an electronic circuit board for an electronic component for operating the switching element.

According to the first aspect of the present invention, the switching element is arranged inside the grip portion, and is spaced apart from the electronic circuit board for the electronic component for operating the switching element. As a result, the heat of the switching element is not easily conducted to the electronic component, making it possible to reduce the measures for protecting the electronic component from heating.

Further, since the switching element is arranged inside the grip portion, there is no need to provide a space for the switching element behind the DC brushless motor, thereby preventing an increase in the entire length of the electric power tool.

According to a second aspect of the present invention, there is formed at a protruding end of the grip portion a battery pack connection portion to which a battery pack is detachably connected, with the electronic circuit board for the electronic component being arranged inside the space of the grip portion and along the battery pack connection portion.

According to another aspect of the present invention, the switching element is mounted to a power circuit board, and the power circuit board is set in position along the longitudinal direction of the grip portion, with the board surface thereof being oriented substantially in the same direction as the board surface of a motor board attached to an end surface of the DC brushless motor, wherein both end edges in the width direction of the power circuit board are supported by an inner wall surface of the grip portion.

According to the present invention, both end edges of the power circuit board to which the switching element is attached are supported by the inner wall surface of the grip portion. As a result, the contact area between the power circuit board and the grip portion can be reduced, making it limited for the heat of the switching element to be conducted to the grip portion.

Further, since the board surface of the power circuit board is oriented substantially in the same direction as the board surface of the motor board attached to an end surface of the DC brushless motor, no twisting is generated in a plurality of power lines connecting the power circuit board (the switching element) and the motor board (the DC brushless motor), thereby making the wiring space to be compact.

According to another aspect of the present invention, the switching element is covered with a heat radiation material or a heat insulation material.

As a result, the heat of the switching element is not easily conducted to the grip portion.

According to another aspect of the present invention, the inner wall surface of the grip portion is covered with a heat radiation material or a heat insulation material.

As a result, the heat of the switching element is not easily conducted to the grip portion.

According to the present invention, the switching element is arranged inside the grip portion so as to be spaced apart from an electronic component such as a microprocessor, whereby it is possible to reduce the heat protection measures for the electronic component without involving an increase in the entire length of the electric power tool.

DETAILED DESCRIPTION OF THE INVENTION

Embodiment 1

In the following, an electric power tool according to an embodiment 1 of the present invention will be described with reference to FIGS. 1 to 3. The electric power tool of this embodiment is a rotary driving tool (an impact driver) using a DC brushless motor as the drive source.

<Outline of Electric Power Tool>

Figure 1:
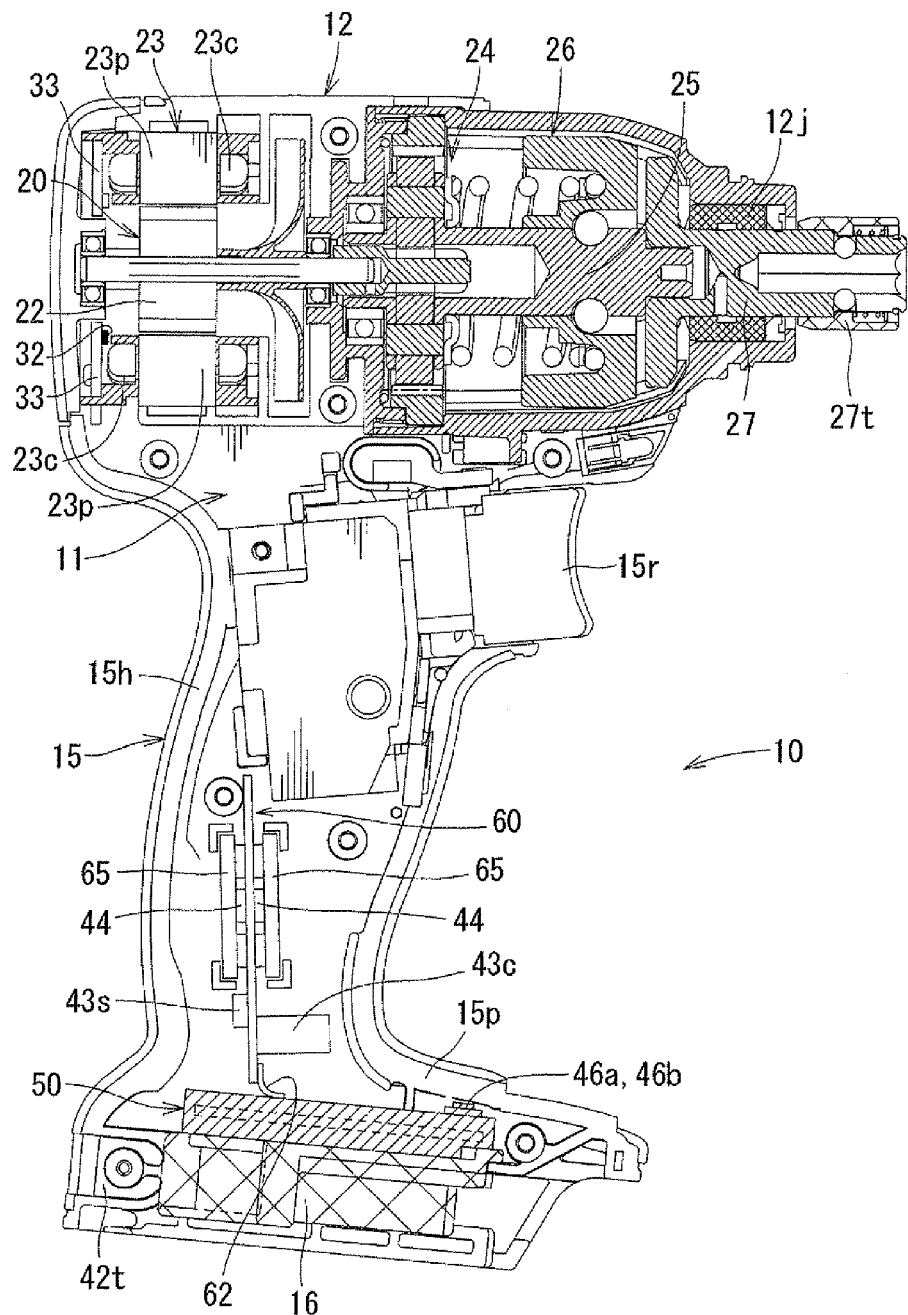
FIG. 1 is a longitudinal sectional view of an electric power tool according to an embodiment 1 of the present invention.

As shown in FIG. 1, a housing 11 of an electric power tool 10 according to this embodiment includes a housing main body portion 12, and a grip portion 15 formed to protrude from a side portion (the lower portion as seen in FIG. 1) of the housing main body portion 12. The grip portion 15 includes a handle portion 15h grasped by the user when he or she uses the electric power tool 10, and an exposed portion 15p located on the protruding end (lower end) side of the handle portion 15h. The handle portion 15h is formed in a relatively small diameter so that it can be easily grasped by the user. And, at a proximal end portion of the handle portion 15h, there is provided a trigger type switch lever 15r to be pulled by the user with a finger.

The exposed portion 15p of the grip portion 15 expands in a direction nearly perpendicular to the longitudinal direction with respect to the handle portion 15h, and, under the exposed portion 15p, there is provided a battery pack connection portion 16 to which a battery pack (not shown) is connected.

A DC brushless motor 20, a planetary gear mechanism 24, a spindle 25, a driving force generation mechanism 26, and an anvil 27 in that order from the rear side are coaxially accommodated in the housing main body portion 12. And, the rotational power of the DC brushless motor 20 is transmitted to the spindle 25 via the planetary gear mechanism 24, and the rotational force of the spindle 25 is converted to a rotational driving force by the driving force generation mechanism 26, and is transmitted to the anvil 27. The anvil 27 is supported by a bearing 12j, provided at the forward end of the housing main body portion 12, so as to be rotatable around the axis and to be incapable of displacement in the axial direction. A chuck portion 27t for the attachment of a driver bit, socket bit or the like (not shown) is provided at the forward end portion of the anvil 27.

<DC Brushless Motor 20>

As shown in FIG. 1, the DC brushless motor 20 includes a rotor 22 provided with a permanent magnet, and a stator 23 provided with a drive coil 23c. The stator 23 is provided with a tubular body portion (not shown) and six tooth portions 23p protruding radially inwards from the inner peripheral surface of the tubular body portion, with the tooth portions 23p being arranged at equal intervals around the rotor 22. The drive coil 23c is wound around each tooth portion 23p through the intermediation of an insulation material.

Further, magnetic sensors 32 for detecting the position of a magnetic pole of the rotor 22 are mounted to the rear end portion of the stator 23 via a motor board 33 (described below). As a result, by sequentially supplying current to each drive coil 23c from a drive circuit 40 while detecting the position of the magnetic pole of the rotor 22 by the magnetic sensor 32, it is possible to rotate the rotor 22.

<Magnetic Sensor 32>

Three magnetic sensors 32 are used as a set, with the three magnetic sensors 32 being arranged at equal intervals in the peripheral direction. The three magnetic sensors 32 are mounted to a ring-like motor board 33 shown in FIG. 3. The motor board 33 is fastened by a screw to the rear end portion of the stator 23 while being coaxial with the stator 23 of the DC brushless motor 20 (See FIG. 1).

Further, a relay portion T (See FIG. 3) connecting the windings of the drive coils 23c and power lines 41 (described below) is provided on the motor board 33.

<Drive Circuit 40>

Figure 2:
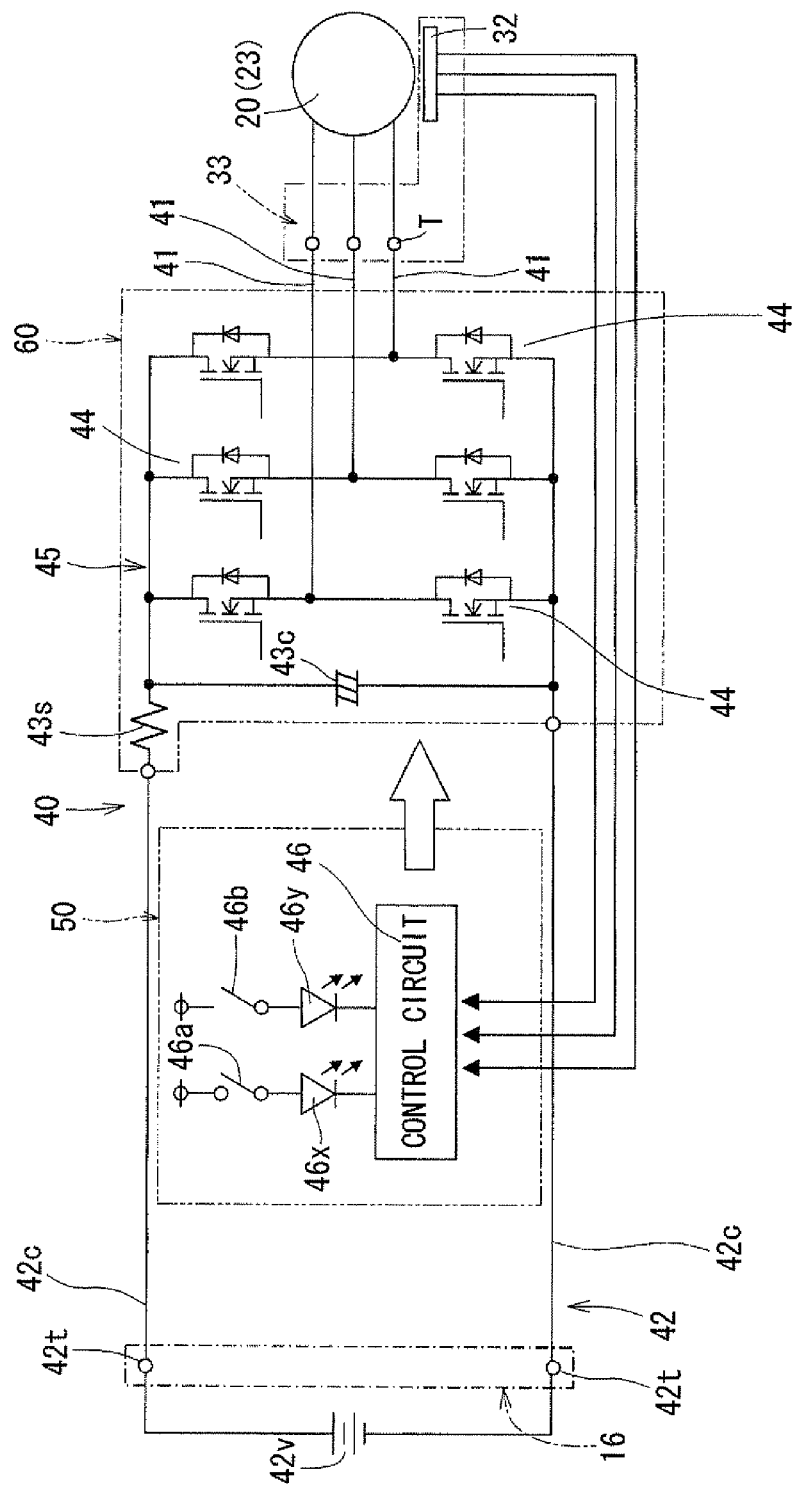
FIG. 2 is a diagram showing a drive circuit configuration of a DC brushless motor.

As shown in FIG. 2, the drive circuit 40 of the DC brushless motor 20 is provided with a power source circuit portion 42, a three-phase bridge circuit portion 45 including six switching elements 44, and a control circuit portion 46 for controlling the switching elements 44 of the three-phase bridge circuit portion 45. The power source circuit portion 42 is for receiving an electric power supplied to the electric power tool 10 from a battery 42 in the battery pack via terminals 42t of the battery pack connection portion 16. The power source circuit portion 42 is provided with a power source line 42c connected to the terminals 42t, a power source smoothing capacitor 43c, and a shunt resistor 43s for current detection connected in series to the power source line 42c.

The three-phase bridge circuit portion 45 is connected to the power source line 42c in parallel with the power source smoothing capacitor 43c, and the three output lines 41 (hereinafter Wined the power lines 41) of the three-phase circuit portion 45 are connected to the windings of the drive coils 23c via the relay portion T of the motor board 33, as described above. Here, there are used, for example, field-effect transistors (FET) as the switching elements 44 of the three-phase bridge circuit portion 45.

The control circuit portion 46 includes an electronic component such as a microprocessor, IC or the like for operating the switching elements 44. The control circuit portion 46 receives signals from the three magnetic sensors 32, and, based on the signals, an on/off-control of the switching elements 44 constituting the three-phase circuit portion 45 is performed (Refer to the hollow arrow in the diagram). As a result, it is possible to sequentially supply current to the drive coils 23c of the stator 23.

Further, signals from various switches 46a and 46b for switching tightening speed and for turning on/off a tool light are input to the control circuit portion 46. Further, LEDs 46x and 46y indicating tightening speed, battery capacity, etc are incorporated into the control circuit portion 46.

The drive circuit 40 of the DC brushless motor 20 is set inside the grip portion 15 in the form of an electronic circuit board 50 and power circuit board 60.

<Electronic Circuit Board 50>

The electronic circuit board 50 is the board to which the control circuit portion 46, the various switches 46a and 46b, and the LEDs 46x and 46y are attached. As shown in FIG. 1, the electronic circuit board 50 is mounted inside the exposed portion 15p of the grip portion 15 while lying along the upper surface of the battery pack connection portion 16.

Here, on the front portion surface of the exposed portion 15p of the grip portion 15, there are provided an operating portion (not shown) for operating the various switches 46a and 46b, and a display-checking portion (e.g. a transparent portion) allowing a user to check a display of the various LEDs 46x and 46y.

<Power Circuit Board 60>

The power circuit board 60 is a board to which the six switching elements 55 constituting the three-phase bridge circuit portion 45, the power source smoothing capacitor 43c of the power source circuit portion 42, and the shunt resistor 43s, etc. are mounted. As shown in FIG. 1, the power circuit board 60 is set standing within the handle portion 15h of the grip portion 15 (i.e., extending along the longitudinal direction of the handle portion 15h), with the board surface thereof being oriented to the front side of the electric power tool 10 in the same way as the board of the motor board 33. And, both the right and left end edges of the power circuit board 60 are supported by the inner wall surface of the handle portion 15h of the grip portion 15.

Three switching elements 44 are mounted to the front surface of the board of the power circuit board 60 so as to be arranged vertically at predetermined intervals, and the power source smoothing capacitor 43c is arranged on the lower portion of the front side of the board. Similarly, as shown in FIG. 3, three switching elements 44a are mounted to the rear surface of the board of the power circuit board 60 so as to be arranged vertically at predetermined intervals, and the shunt resistor 43s is arranged on the lower portion of the rear surface of the board. Further, as shown in FIG. 1, the surfaces of the switching elements 44 mounted to the board front surface and the board rear surface of the power circuit board 60 are covered with a heatsink 65 formed of aluminum alloy.

The power circuit board 60 and the electronic circuit board 50 are electrically connected to each other by a flexible control cable 62.

Figure 3:
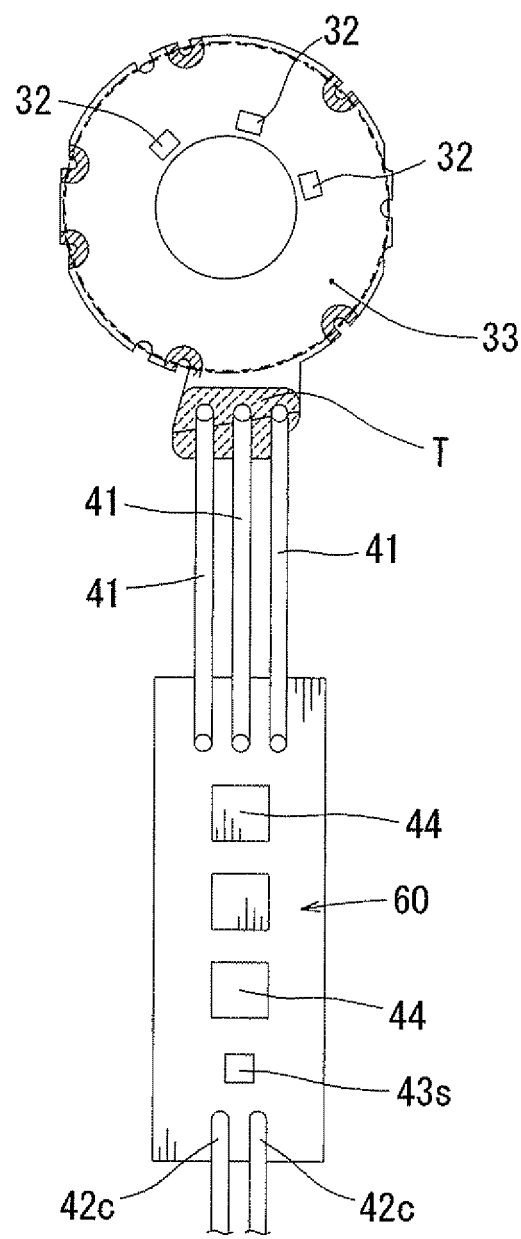
FIG. 3 is a rear view of a motor board for the DC brushless motor and of a power circuit board.

Further, as shown in FIG. 3, one ends of power source lines 42c of the drive circuit 40 are connected to the power circuit board 60, and the other ends of the power source lines 42c are connected to the terminals 42t of the battery pack portion 16 as shown in FIG. 2. Further, as shown in FIG. 3, the power circuit board 60 and the relay portion T of the motor board 33 are connected to each other by three power lines 41. Here, the respective board surfaces of the power circuit board 60 and the motor board 33 are both oriented forwards, so that the three power lines 41 may not be twisted, whereby it is possible to make the wiring space to be compact.

<Advantage of Electric Power Tool 10 of the Present Invention>

As shown in FIG. 1, in the electric power tool 10 of this embodiment, the switching elements 44 are arranged inside the grip portion 15, and are spaced apart from the electronic circuit board 50 for the electronic component for operating the switching elements 44. Thus, the heat of the switching elements 44 is not easily conducted to the microprocessor or the like (electronic component) of the control circuit portion 46, thereby reducing the heat protection measures for the electronic component.

Further, since the switching elements 44 are arranged inside the grip portion 15, there is no need for providing a space for the switching elements 44 behind the DC brushless motor 20, so that the entire length of the electric power tool 10 may not increase.

Further, both end edges in the width direction of the power circuit board 60 are supported by the inner wall surface of the grip portion 15, so that the contact area between the power circuit board 60 and the grip portion 15 is reduced, whereby the heat of the switching elements 44 is not easily conducted to the grip portion 15.

Further, the board surface of the power circuit board 60 is oriented substantially in the same direction as the board surface of the motor board 33 attached to the end surface of the brushless motor 20, so that twisting is not easily generated in the three power lines 41 connecting the power circuit board 60 (the switching elements 44) and the motor board 33 (the DC brushless motor 20), making it possible to make the wiring space to be compact.

Further, the switching elements 44 are covered with the heatsink 65 (heat radiation material) formed of aluminum alloy, so that the switching elements 44 are not heated at high temperatures, whereby the heat of the switching elements 44 is not easily conducted to the grip portion 15.

Modification Examples

Here, it should be noted that the present invention is not restricted to the above embodiment but allows modifications without departing from the scope of the invention. For example, in the embodiment described above, the switching elements 44 are covered with the heatsink 65 formed of aluminum alloy, but it is also possible to cover the inner wall surface of the grip portion 15 with a heat insulating material instead of providing the heatsink 65 mentioned above. Further, it is also possible to cover the inner wall surface of the grip portion 15 with a heat insulating material, with the switching elements 44 being covered with the heatsink 65 formed of aluminum alloy. Further, instead of covering them with the heatsink 65, it is also possible to cover the switching elements 44 with a heat insulating material.

Further, in the embodiment described above, three switching elements 44 are mounted to each of the board front surface and the board rear surface of the power circuit board 60, and it is also possible to prepare two power circuit boards, three switching elements 44 being mounted to each power circuit board. This makes it possible to improve the cooling efficiency of the switching elements 44.

Further, an impact driver is shown as the electric power tool 10 in this embodiment, and the present invention is also applicable to electric power tools other than the impact driver described above.

EXPLANATION OF SYMBOLS

10 . . . electric power tool
12 . . . housing main body portion
15 . . . grip portion
15h . . . handle portion
16 . . . battery pack connection portion
20 . . . DC brushless motor
33 . . . motor board
40 . . . drive circuit
44 . . . switching element
46 . . . control circuit portion
50 . . . electronic circuit board
60 . . . power circuit board
65 . . . heatsink

The invention claimed is:

1. An electric power tool, comprising:
a DC brushless motor;
a housing that houses the DC brushless motor at a rear of the housing;
a battery that is attached to the housing;
a motor board that is fixed with regard to the DC brushless motor and that has a board surface upon which at least one sensor is mounted;
a first circuit board that supports a plurality of switching elements configured to supply an electric current to the DC brushless motor and that is mounted to the housing, at least one of the switching elements being mounted on a board surface of the first circuit board that is oriented in substantially the same direction as the board surface of the motor board;
a second circuit board electrically connected to the first circuit board; and
a heat radiation material configured to radiate heat generated by the plurality of switching elements and provided within the housing,
wherein the plurality of switching elements comprises a first switching element, a second switching element, and a third switching element,
wherein the first switching element is located above the second and third switching elements, and
wherein the second switching element is located above the third switching element.

2. The electric power tool according to claim 1, wherein a switch for switching the rotating speed of the DC brushless motor is provided on the second circuit board.

3. The electric power tool according to claim 1, wherein a microprocessor is provided on the second circuit board.

4. The electric power tool according to claim 1, wherein the heat radiation material is a thermally conductive material.

5. The electric power tool according to claim 4, wherein the heat radiation material is a metal.

6. The electric power tool according to claim 5, wherein the heat radiation material is aluminum.

7. The electric power tool according to claim 1, wherein the first circuit board includes a smoothing capacitor.

8. The electric power tool according to claim 7, wherein the smoothing capacitor is provided on a same side of the first circuit board as the plurality of switching elements.

9. The electric power tool according to claim 1, wherein the first circuit board includes a shunt resistor.

10. The electric power tool according to claim 9, wherein the shunt resistor is provided on a same side of the first circuit board as the plurality of switching elements.

11. The electric power tool according to claim 1,
wherein the housing includes a grip portion; and
wherein the heat radiation material is disposed within the grip portion.

12. The electric power tool according to claim 1, wherein the second circuit board is electrically connected to the first circuit board via a flexible cable.

13. The electric power tool according to claim 1, wherein the board surface of the first circuit board forms a plane that intersects a plane formed by the board surface of the motor board.

14. An electric power tool, comprising:
a DC brushless motor;
a housing that houses the DC brushless motor at a rear of the housing;
a battery that is attached to the housing;
a motor board that is fixed with regard to the DC brushless motor and that has a board surface upon which at least one sensor is mounted;
a first circuit board that supports a plurality of switching elements configured to supply an electric current to the DC brushless motor and that is mounted to the housing, at least one of the switching elements being mounted on a board surface of the first circuit board, a normal of the board surface of the first circuit board being substantially parallel to a normal of the board surface of the motor board;
a second circuit board electrically connected to the first circuit board; and
a heat radiation material configured to radiate heat generated by the plurality of switching elements and provided within the housing.

15. The electric power tool according to claim 14, wherein the board surface of the first circuit board forms a plane that intersects a plane formed by the board surface of the motor board.

16. An electric power tool, comprising:
a DC brushless motor;
a housing that houses the DC brushless motor;
a handle coupled to the housing;
a battery that is attached to the handle;
a motor board that is fixed with regard to the DC brushless motor and that has a board surface upon which at least one sensor is mounted; and
a first board disposed inside the handle, the first board having a board surface upon which at least one switching element configured to supply an electric current to the DC brushless motor is mounted,
wherein the board surface of the motor board is substantially parallel to the board surface of the first board.

17. The electric power tool according to claim 16, wherein the board surface of the first board forms a plane that intersects a plane formed by the board surface of the motor board.

18. An electric power tool, comprising:
a DC brushless motor;
a housing that houses the DC brushless motor;
a handle coupled to the housing;
a trigger lever provided on the handle;
a battery that is attached to the handle;
a motor board that is fixed with regard to the DC brushless motor and that has a board surface upon which at least one sensor is mounted, the board surface of the motor board extending in the vertical direction; and
a first board disposed inside the handle, the first board having a board surface upon which at least one switching element configured to supply an electric current to the DC brushless motor is mounted,
wherein the first board is disposed below the trigger lever and the board surface of the first board extends in substantially the same direction as the board surface of the motor board.

19. The electric power tool according to claim 18, wherein the board surface of the first board forms a plane that intersects a plane formed by the board surface of the motor board.

20. An electric power tool, comprising:
a DC brushless motor;
a housing that houses the DC brushless motor;
a handle coupled to the housing;
a battery attached to the housing;
a motor board that is fixed with regard to the DC brushless motor and that has a board surface upon which at least one sensor is mounted, the board surface of the motor board extending substantially in a vertical direction; and
a first board disposed inside the handle and having a board surface upon which a plurality of switching elements are mounted, the board surface of the first board extending substantially in the vertical direction such that the switching elements are disposed in substantially the vertical direction.

21. The electric power tool according to claim 20, wherein the board surface of the first board forms a plane that intersects a plane formed by the board surface of the motor board.

* * * * *